US012713079B2

(12) United States Patent
Chen et al.

(10) Patent No.: US 12,713,079 B2
(45) Date of Patent: Aug. 18, 2026

(54) SINGLE FORMAT FRAME PACKING AND VIDEO COMPRESSION FOR BACKWARD COMPATIBLE DISTRIBUTION OF 3D HDR CONTENT

(71) Applicant: Adeia Guides Inc., San Jose, CA (US)

(72) Inventors: Tao Chen, Palo Alto, CA (US); Reda Harb, Tampa, FL (US)

(73) Assignee: Adeia Guides Inc., San Jose, CA (US)

( * ) Notice: Subject to any disclaimer, the term of this patent is extended or adjusted under 35 U.S.C. 154(b) by 167 days.

(21) Appl. No.: 18/618,672

(22) Filed: Mar. 27, 2024

(65) Prior Publication Data

US 2025/0310578 A1 Oct. 2, 2025

(51) Int. Cl.

*H04N 21/234* (2011.01)
*H04N 13/139* (2018.01)
*H04N 21/2343* (2011.01)
*H04N 21/81* (2011.01)

(52) U.S. Cl.

CPC ... *H04N 21/234327* (2013.01); *H04N 13/139* (2018.05); *H04N 21/816* (2013.01)

(58) Field of Classification Search

None

See application file for complete search history.

(56) References Cited

U.S. PATENT DOCUMENTS 6,170,074 B1 1/2001 Kondo et al.
7,006,568 B1 2/2006 Gu et al.
7,667,707 B1 2/2010 Margulis
8,175,158 B2 5/2012 Segall
8,774,559 B2 7/2014 Segall
9,225,961 B2 12/2015 Chen et al.
9,877,046 B2 1/2018 Tourapis et al.
10,079,872 B1 9/2018 Thomas et al.
11,146,834 B1 10/2021 Shen et al.
11,917,122 B1 2/2024 Aman et al.

(Continued)

FOREIGN PATENT DOCUMENTS

EP 2667610 A2 * 11/2013 ........... H04N 13/161
WO WO-2023215108 A1 * 11/2023 ........... H04N 13/178

OTHER PUBLICATIONS

U.S. Appl. No. 18/618,663, filed Mar. 27, 2024, Tao Chen.

(Continued)

*Primary Examiner* — Omar S Parra
(74) *Attorney, Agent, or Firm* — HG Law LLP

(57) ABSTRACT

3D HDR content is packed for delivery compatible with multiple output formats. First and second processed versions of the content are generated from a first eye perspective portion of the 3D content. Third and fourth processed versions of the content are generated from a second eye perspective portion of the 3D content. From the first processed version of the content, a fifth processed version of the content is generated comprising a SDR version of the first processed version of the content. From the fourth processed version of the content, a sixth processed version of the content is generated comprising a SDR version of the fourth processed version of the content. The fifth and third processed versions of the content are placed in a base layer of the delivery format and the second and sixth processed versions of the content are placed into an enhancement layer of the delivery format.

18 Claims, 11 Drawing Sheets

(56) References Cited

U.S. PATENT DOCUMENTS

2005/0111746 A1 5/2005 Kumar et al.
2008/0071839 A1 3/2008 Sattler et al.
2011/0194618 A1 8/2011 Gish et al.
2012/0013614 A1 1/2012 Matsuhiro et al.
2012/0082309 A1 4/2012 Wen
2012/0192115 A1 7/2012 Falchuk et al.
2013/0108183 A1 5/2013 Bruls et al.
2014/0002598 A1 1/2014 Kim et al.
2014/0037206 A1 2/2014 Newton et al.
2014/0337139 A1 11/2014 Thomas et al.
2014/0348232 A1 11/2014 Leontaris et al.
2015/0003749 A1 1/2015 Kim et al.
2015/0156469 A1 6/2015 Qu et al.
2015/0350707 A1 12/2015 Reynolds
2015/0350729 A1 12/2015 Reynolds
2016/0080448 A1 3/2016 Spears et al.
2016/0286226 A1 9/2016 Ridge et al.
2017/0127126 A1 5/2017 Strein et al.
2017/0214924 A1 7/2017 Su
2019/0320187 A1 10/2019 Fuchie et al.
2019/0325114 A1 10/2019 Maughan et al.
2019/0349581 A1 11/2019 Fuchie et al.
2020/0380765 A1 12/2020 Thudor et al.
2020/0413099 A1 12/2020 Su et al.
2021/0111916 A1 4/2021 Velayutham et al.
2021/0134019 A1 5/2021 Wyman et al.
2021/0150812 A1 5/2021 Su et al.
2021/0176496 A1 6/2021 Chupeau et al.
2021/0274244 A1 9/2021 Wondra et al.
2021/0358089 A1 11/2021 Wen et al.
2022/0408081 A1 12/2022 Su et al.
2022/0417604 A1 12/2022 Chandrashekar et al.
2023/0083884 A1 3/2023 Molitor et al.
2023/0217066 A1 7/2023 Redmann
2023/0281876 A1 9/2023 Zhang et al.
2023/0421793 A1 12/2023 Skupin et al.
2023/0421812 A1 12/2023 Tourapis et al.
2024/0397092 A1 11/2024 Kondrad et al.
2025/0016297 A1 1/2025 Presler
2025/0069273 A1 2/2025 Zakharchenko et al.
2025/0133241 A1 4/2025 Kadu et al.
2025/0294127 A1 9/2025 Husak et al.
2025/0308142 A1 10/2025 Su et al.
2025/0310508 A1 10/2025 Chen et al.
2026/0019639 A1 1/2026 Zakharchenko et al.
2026/0030730 A1 1/2026 Su et al.

OTHER PUBLICATIONS

"High-dynamic-range television," Wikipedia, https://en.wikipedia.org/wiki/High-dynamic-range_television, 14 pages, retrieved on Jun. 10, 2024.

"Methods for conversion of high dynamic range content to standard dynamic range content and vice-versa," retrieved from URL: https://www.itu.int/pub/R-REP-BT.2446, 32 pages (Mar. 2021).

Lu, T., et al., "Practical operating points of multi-resolution frame compatible (MFC) stereo coding," Applications of Digital Image Processing XXXVI—(8856): pp. 557-566 (2013).

Vinker, Y., et al., "Unpaired learning for high dynamic range image tone mapping," Proceedings of the IEEE/CVF international conference on computer vision, 14657-14666 (2021).

"HEVC-Stereo-Video-Profile (apple.com)", 14 pages.

* cited by examiner

SINGLE FORMAT FRAME PACKING AND VIDEO COMPRESSION FOR BACKWARD COMPATIBLE DISTRIBUTION OF 3D HDR CONTENT

BACKGROUND

This disclosure relates to video content delivery. In particular, a new frame packing solution is provided to support delivering a single stream for multiple viewing modes and eliminating interoperability issues to improve the content consumption experience.

SUMMARY

Backward compatibility for image and video decoding and rendering has always been a desire for interoperability across numerous devices, platforms, services, etc. It is, however, common that newer and more advanced formats are not supported by earlier generations of devices. Advancements in video technology have introduced new features in capture, creation, and consumption of different types of video content. Formats used for distribution of two-dimensional (2D), three-dimensional (3D), and high dynamic range (HDR) content vary. When multiple features are supported, the compression and delivery of content become more complex. This introduces issues with backward compatibility on existing and legacy devices, and incompatible or unsupported formats often introduce fragmentation.

The Apple TV and Vision Pro support 3D by using Multiview High Efficiency Video Encoding (MV-HEVC), which unfortunately requires conversion to an earlier 3D format so that it can be displayed on other devices, e.g., Quest, Pico, Vive XR Elite, or any PC virtual reality (VR) headsets. Most of the earlier head mounted display (HMD) devices deploy a side-by-side format. Many VR headsets support HDR viewing with advanced OLED and micro-LED display technologies. 3D video in HDR can be one of the ultimate experiences desired in such large screen immersion, including in cloud gaming. 3D HDR content rendering is more primed in gaming than in other content creation and production. In the case of multi-player cloud gaming, a console or server encodes and streams to multiple players with varying capabilities of decoding and displaying a same content. It is a significant challenge in cloud gaming for a console to simultaneously encode content of 3D HDR in multiple various formats to accommodate appropriate playback.

Scalable solutions are a natural choice in practice. However, it is usually content packed in the base layer (BL) that is decoded and played on most of the devices since support for decoding the enhancement layer (EL) is lacking in most devices. The EL in an existing scalable codec usually offers enhanced picture quality (e.g., a higher resolution) over what is decoded from the BL. However, in the above case of MV-HEVC, the EL brings in an additional viewing mode and experience, i.e., 3D, which does not exist if the device only decodes the BL. There is clearly a requirement for the device to support decoding the EL in order to render 3D.

In the scenario of 3D in standard dynamic range (SDR) only, multi-resolution frame-compatible stereoscopic encoding (MFC) was an elegant solution adopted into the Advanced Video Coding (AVC) and High Efficiency Video Coding (HEVC) standards. Decoding the BL alone can support both 2D and 3D viewing, while decoding the EL improves picture quality. But none of the supported modes consider the use case of HDR.

High quality 2D video remains important and HDR video has become commonly supported. 3D video formats that have so far failed to become popularized may be brought back by the Apple Vision Pro and other advanced HMDs. Considering the potential 3D HDR content creation and immersive viewing with capable display devices, it is of significant value if there is a solution to support delivering a single stream for multiple viewing modes, e.g., 2D, 2D in HDR, 3D and 3D in HDR, even when there is no need to decode and process the EL. Such a solution will eliminate the well-known interoperability issue and thus provide a great opportunity for a single format to deliver multiple viewing experiences.

For content created in 3D and HDR, a single format of flexible frame packing, encoded using any suitable codec, can accommodate a dual layer bitstream structure. For compatible legacy decoders, the BL can be decoded and displayed in (a) 2D, in half-resolution and upscaled; (b) 3D, in half-resolution and upscaled; (c) 2D in HDR, in half-resolution and upscaled; or (d) 3D in HDR, in half-resolution and upscaled. For decoders that support the EL, both the BL and EL can be utilized. The BL and EL can be decoded and rendered in (a) 2D, in full-resolution; (b) in 3D, in full-resolution; (c) in 2D in HDR, in full-resolution; or (d) in 3D in HDR, in full-resolution.

The differences over previous frame packing techniques are the inclusion of both SDR and HDR video in one single layer (either BL or EL), or the inclusion of SDR in one layer while the HDR version is in the other layer. There is great flexibility in constructing reference frames for inter-layer prediction, and the EL encoder will have multiple modes to optimize for the best compression efficiency.

3D video in HDR has become relevant and provides an ultimate experience that can prevail on the advanced devices of great display capabilities. Content creation and rendering in gaming is ready to offer both 3D and HDR, and it is more primed than in other video content production. In multi-player cloud gaming, it is highly desirable if a console can encode 3D HDR in a single frame packing format to serve as many devices as possible and accommodate appropriate playback in selected viewing modes. Additionally, 3D HDR video capturing may soon be available on advanced devices such as the Apple Vision Pro and other advanced HMDs. Sharing such content to enable various viewing modes in 2D, 3D and HDR will require transcoding or conversion if the first distribution format is not widely supported on many devices from different manufacturers. The proposed solution provides an encoding and frame packing scheme that results in reduced fragmentation but eliminating or reducing the need for conversions between multiple formats.

Systems and methods are described herein for packing 3D high dynamic range (HDR) content for delivery compatible with multiple output formats. A first processed version of the content and a second processed version of the content are generated from a first eye perspective portion of the 3D content. For example, the left-eye perspective portion of the 3D content may be filtered and scaled (a) in the horizontal direction to generate a half-resolution version (i.e., half the width of the original 3D content) of the left-eye perspective portion of the 3D content, and (b) in the vertical direction to generate a half-resolution version (i.e., half the height of the original 3D content) of the left-eye perspective portion of the 3D content. A third processed version of the content and a fourth processed version of the content are generated from a second eye perspective portion of the 3D content. For example, the right-eye perspective portion of the 3D content may be filtered and scaled (a) in the horizontal direction to generate a half-resolution version (i.e., half the width of the original 3D content) of the right-eye perspective portion of the 3D content, and (b) in the vertical direction to generate a half-resolution version (i.e., half the height of the original 3D content) of the right-eye perspective portion of the 3D content.

From the first processed version of the content (e.g., the horizontally-scaled version of the left-eye perspective portion of the content), a fifth processed version of the content is generated comprising a standard dynamic range (SDR) version of the first processed version of the content. From the fourth processed version of the content (e.g., the vertically-scaled version of the right-eye perspective portion of the content), a sixth processed version of the content is generated comprising a SDR version of the fourth processed version of the content.

The second processed version of the content, the third processed version of the content, the fifth processed version of the content, and the sixth processed version of the content are then packed into a delivery format. The fifth processed version of the content and the third processed version of the content are placed in a BL of the delivery format and the second processed version of the content and the sixth processed version of the content are placed into an EL of the delivery format.

In some embodiments, generating SDR versions of the content is achieved by performing tone mapping on the version of the content being processed. Converting some HDR versions of the content to SDR allows for multiple output formats. By using one or more of the versions packed in the delivery format, a compatible playback device may output any of 3D HDR content, 3D SDR content, 2D HDR content, and 2D SDR content.

If the playback device does not support processing the EL of the delivery format, the playback device accesses the BL of the delivery format to retrieve the processed versions of the content packed therein. The third and fifth processed versions of the content are each upscaled to full horizontal resolution. This yields a full-resolution HDR version of the left-eye perspective and a full-resolution SDR frame of the right eye perspective. If the playback device does not support processing HDR content, a seventh processed version of the content is generated from the upscaled third version of the content, yielding a SDR version of the upscaled third processed version of the content. 3D SDR content is then output based on the upscaled fifth processed version of the content and the seventh processed version of the content. If the playback device does support processing HDR content, an eight processed version of the content is generated from the upscaled fifth processed version of the content, yielding a HDR version of the upscaled fifth processed version of the content. 3D HDR content is then output based on the eighth processed version of the content and the upscaled third processed version of the content.

If the playback device supports processing the EL of the delivery format and does not support processing HDR content, the playback device may accessing the BL of the delivery format to retrieve and upscale the fifth processed version of the content, resulting in a full-resolution SDR frame of the left-eye perspective. The playback device may also access the EL of the delivery format to retrieve and upscaling the sixth processed version of the content, resulting in a full-resolution SDR frame of the right-eye perspective. 3D SDR content is the output based on the upscaled fifth processed version of the content and the upscaled sixth processed version of the content.

If the playback device supports processing the EL of the delivery format and does support processing HDR content, the playback device may access the BL of the delivery format to retrieve and upscale the third processed version of the content, resulting in a full-resolution HDR frame of the right-eye perspective. The playback device may also access the EL of the delivery format to retrieve and upscale the second processed version of the content, resulting in a full-resolution HDR frame of the left-eye perspective. 3D HDR content is then output based on the upscaled second processed version of the content and the upscaled third processed version of the content.

In some embodiments, user preferences and/or user subscription levels may be used to control what types of content the playback device outputs. For example, a user may have purchased a first subscription level that allows the user the view HDR content but not 3D content, a second subscription level that allows the user to view 3D content but not HDR content, or a third subscription level that allows the user to view both HDR and 3D content. The playback device may default to outputting 2D SDR content. Upon receiving content in the delivery format, the playback device may check the user's subscription level. If the user's subscription level allows the user to view HDR content, the playback device may instead output 2D HDR content. If the user's subscription level allows the user to view 3D content, the playback device may output 3D SDR content. If the user's subscription level allows the user to view both HDR and 3D content, the playback device may output 3D HDR content.

The type of content output by the playback device may be controlled by user preferences. For example, the user may prefer to watch movies in a 3D HDR format, news programs in a 2D SDR format, and sports programs in a 2D HDR format. Upon receiving content in the delivery format, the playback device may identify the type of the content. For example, metadata contained in or associated with the received content may identify the type of the content. The playback device may retrieve user preferences for output of the identified type of content. Based on the user preferences, the playback device may access the appropriate version(s) of the content from the BL and/or EL of the delivery format.

Access to different versions of a content item packed within a single content stream may be controlled by a playback device. The playback device may perform a first check to determine whether HDR content may be output and a second check to determine whether 3D content may be output. For example, the playback device may determine, based on user subscription information, whether the user is authorized to access HDR and/or 3D content. Based on these checks, the playback device selects at least one version of the content item from the base layer or the enhancement layer. For example, in response to determining that HDR content may be output, the playback device selects at least one of the HDR version of the second-eye perspective portion of the content item from the BL or the HDR version of the first-eye perspective portion of the content item from the EL. If the 3D content may also be output, the playback device further selects at least one of the SDR version of the first-eye perspective portion of the content item from the BL or the SDR version of the second-eye perspective portion of the content item from the EL. The selected SDR version may be processed (e.g., using inverse tone mapping) to generate a corresponding HDR version. Thus, if both HDR and 3D content may be output, the HDR version of the second-eye perspective portion of the content item and the processed HDR version of the SDR version of the first-eye perspective portion of the content item can be used to output 3D HDR content. If HDR content may be output but 3D content may not, then no further portions are selected and an HDR version of a single perspective portion of the content item may be used to output 2D HDR content. In some embodiments the SDR portion of the selected perspective may also be accessed and processed to generate a corresponding HDR version of the portion of the content item which can then be used to provide higher quality 2D content than using one version alone.

If HDR content may not be output, at least one SDR version of the content item may be selected in a manner similar to the selection of at least one HDR version discussed above. If 3D content may be output, the HDR versions may also be accessed and processed (e.g., using tone mapping) to generate corresponding SDR version of the content item. The SDR versions may then be used to output 3D SDR content. If 3D content may not be output, the SDR version packed in the BL may be used to output 2D SDR content. In some embodiments, the corresponding HDR portion of the content item may be accessed from the EL and processed to generate an SDR version of the portion of the content. This may be used to provide higher quality 2D content than using one version alone.

In some embodiments, access to at least one version of content from the content stream is initially prevented. For example, only the SDR version of the first-eye perspective portion of the content item may be accessible at first, as HDR and 3D content may require special subscriptions or other authorization. In some embodiments, the capabilities of the playback device are checked to determine whether HDR and/or 3D content can be processed. After performing the checks discussed above is access to other versions of the content item permitted, and such access is controlled in accordance with the types of content that may be output.

A user interface may be presented at a playback device to allow a user to set preferences for how certain types of content are output. For example, through the user interface a user can indicate, for each type of content, whether that type of content should be output by default as 3D HDR, 2D HDR, 3D SDR, or 2D SDR. When content is accessed, the type of the content is identified and compared to user preferences. If preferences for that type of content have been set, the appropriate portions of the content item are selected from the BL and/or EL for output. If no preference for that type of content have been set, the user may be prompted to select their preference for that content type.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

DETAILED DESCRIPTION

Figure 1:
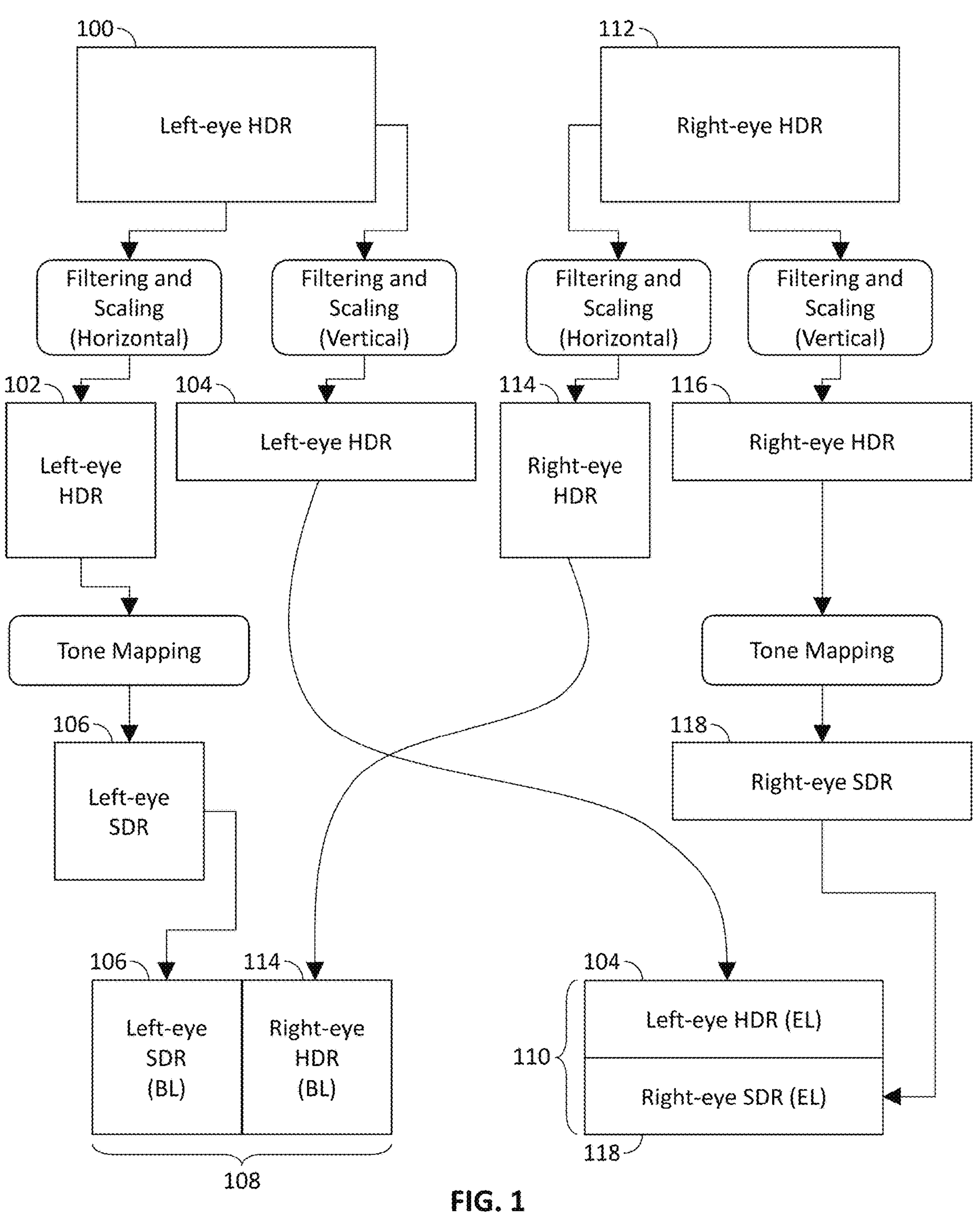
FIG. 1 shows an illustrative example of 3D video packing, in accordance with some embodiments of the disclosure.

There are various frame packing arrangements possible using the methods of this disclosure. FIG. 1 shows one illustrative example of 3D video packing, in accordance with some embodiments of the disclosure. The video data in the BL frame may be encoded with any suitable video codec. The BL bitstream is then compatible with, and decodable by, any device that supports the codec chosen for encoding the media content. The EL is encoded with its corresponding scalable or multi-view option, where both intra-layer and inter-layer prediction can be enabled for better compression efficiency.

In the example of FIG. 1, a HDR version of the left-eye perspective 100 is downsampled twice, once in the horizontal direction and once in the vertical direction. Left-eye HDR content 100 is filtered and scaled in the horizontal direction to produce a HDR version 102 of the left-eye perspective at half the original horizontal resolution. Left-eye HDR content 100 is also filtered and scaled in the vertical direction to produce an HDR version 104 of the left-eye perspective at half the original vertical resolution.

The horizontally-scaled HDR version 102 of the left-eye perspective is then processed using tone mapping. Tone mapping results is a reduction in the number of colors present in the content by mapping each color present in the content to the closest color in a reduced color set. Content processed in this manner preserves image detail while reducing the dynamic range of the content from HDR to SDR. Any suitable known or proprietary technique may be employed to accomplish tone mapping. The resulting SDR version 106 of the left-eye content is packed into BL 108 of the delivery format. The vertically-scaled HDR version 104 of the left-eye perspective is packed into EL 110 of the delivery format without any further processing.

A similar process is performed for a HDR version of the right-eye perspective 112. Right-eye HDR content 112 is filtered and scaled in the horizontal direction to produce a HDR version 114 of the right-eye perspective at half the original horizontal resolution. Right-eye HDR content 112 is also filtered and scaled in the vertical direction to produce a HDR version 116 of the right-eye perspective at half the original vertical resolution. In contrast to the left-eye perspective, however, the horizontally-scaled HDR version 114 of the right-eye perspective is packed into BL 108 of the delivery format without further processing while tone mapping is performed on the vertically-scaled HDR version 116 of the right-eye perspective to produce SDR version 118 of the right-eye perspective. SDR version 118 of the right-eye perspective is then packed into EL 110 of the delivery format. This packing scheme results in half-resolution versions of HDR content for one perspective and SDR content for the other perspective in both the BL and EL of the delivery format.

Figure 2:
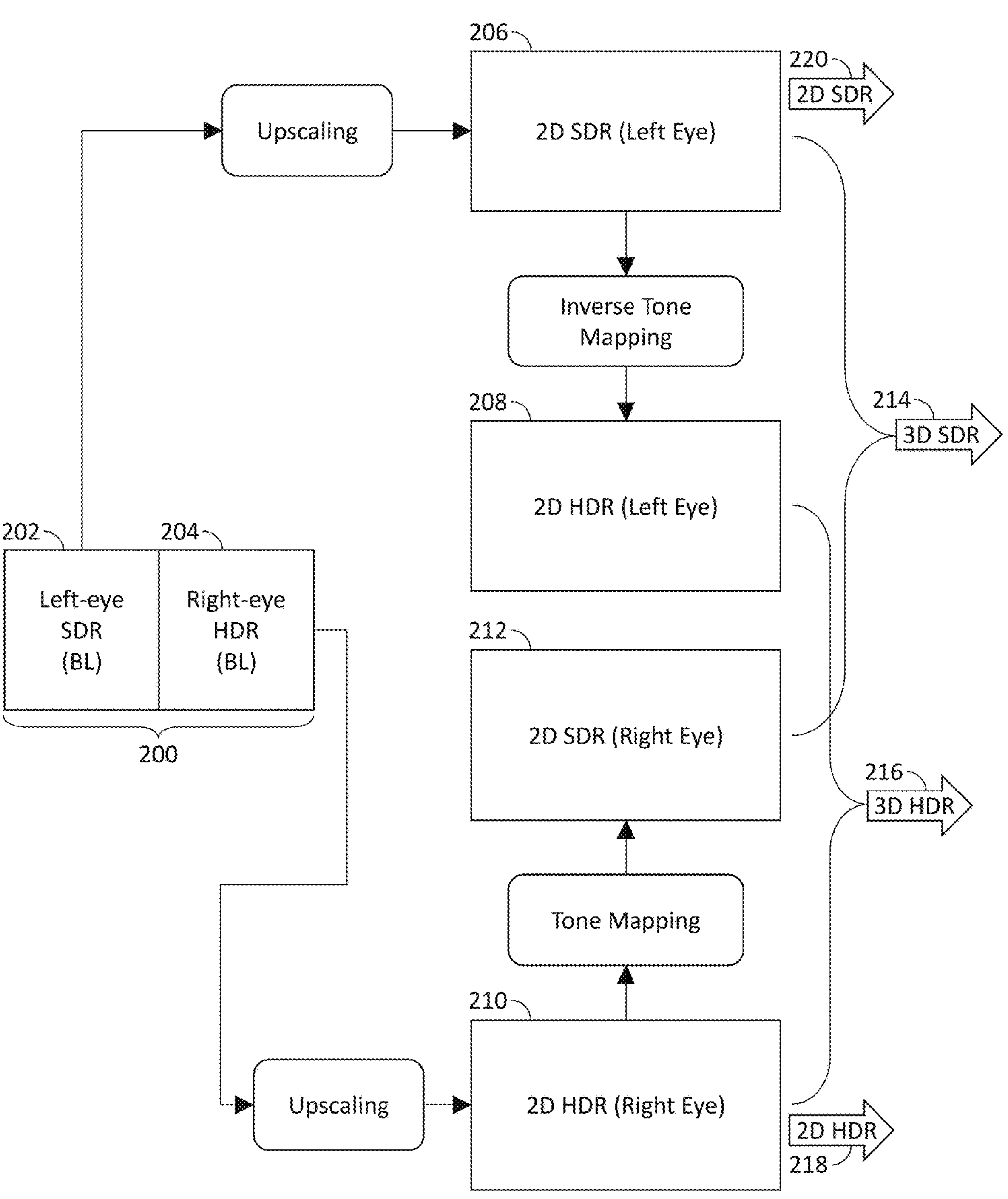
FIG. 2 shows an illustrative example of video unpacking using only the base layer of the delivery format, in accordance with some embodiments of the disclosure.

After BL 108 is decoded, various combinations of viewing experience can be accommodated, including 2D SDR, 2D HDR, 3D SDR and 3D HDR as illustrated in FIG. 2. Such frame packing provides great flexibility in rendering video for an intended viewing, while a single compatible format plays on as many devices and reaches as many customers as possible.

The examples are illustrative, but not exhaustive. For instance, a BL frame can be packed as the horizontally-downsampled left-eye and right-eye pictures, while the EL frame then corresponds to the vertically-downsampled left-eye and right-eye pictures. The parity of SDR or HDR between the BL and EL frames can also be flexible. In other words, it can be left-eye in HDR and right-eye in SDR in the BL frame, and the picture of a same eye can be in SDR or HDR in both layers. The choices determined in the encoding production will be signaled in the bitstream so that after decoding, the player renders appropriate pictures for an intended viewing.

FIG. 2 shows an illustrative example of video unpacking using only the BL of the delivery format, in accordance with some embodiments of the disclosure. BL frame 200 is composed of left-eye SDR frame 202 and right-eye HDR frame 204. Left-eye SDR frame 202 is upscaled to restore the full horizontal resolution of the original 3D content. This results in a full resolution 2D SDR frame 206 for the left-eye perspective of the content. 2D SDR frame 206 may also be processed using inverse tone mapping to generate a 2D HDR frame 208 for the left-eye perspective of the content.

Right-eye HDR frame 204 is also upscaled to restore the full horizontal resolution of the original 3D content. This results in a full resolution 2D HDR frame 210 for the right-eye perspective of the content. 2D HDR frame 210 may also be processed using tone mapping to generate a 2D SDR frame 212 for the right-eye perspective of the content.

As can be seen, many viewing experiences can be accommodated using this format. 2D SDR left-eye frame 206 and 2D SDR right-eye frame 212 may be combined to produce 3D SDR content 214. 2D HDR right-eye frame 210 may be combined with 2D HDR left-eye frame 208 to produce 3D HDR content 216. 2D SDR left-eye frame 206 may be used alone to output 2D SDR content. Similarly, 2D HDR right-eye frame 210 may be used alone to output 2D HDR content.

Though one example is show in FIG. 2, the order of processes after decoding the BL may vary in order to reduce complexity and improve efficiency. For instance, tone mapping can take place first before upscaling because tone mapping is a pixel-based operation and this way it reduces the number of pixels required for tone mapping. Similarly, the inverse tone mapping may occur prior to upscaling. The inverse tone mapping target can be set to the display capability to avoid additional tone mapping. Any known or suitable solution for tone mapping and inverse tone mapping may be used. For best performance, the tone mapping and inverse tone mapping processed may be optimized at the encoder, where HDR sources for both eye perspectives are available. Appropriate parameters related to the tone mapping and inverse tone mapping processes used at the encoder may be carried in the resulting video bitstream.

The backward compatibility to legacy decoders is achieved through the frame packing and encoding of the BL, which is designed to work on a codec choice determined by a platform, service, etc. For the end user devices that are more capable (i.e., able to process the EL and/or HDR content), the EL compression can offer enhanced quality including higher bit-depth. For example, the BL is encoded using an 8-bit encoding scheme while the EL can be encoded using a 10-bit encoding scheme.

The side-by-side packing in the BL is not limited to a reduced resolution, e.g., half the original horizontal size, as shown in FIG. 2. Packing full-size frames in a side-by-side manner is also possible, depending on the needs of a service to deliver content to its target devices.

The bitstream may carry one or more flags to signal the characteristics of the content in the packed frame to the playback device. The proposed packing is not limited to a particular signal encoding in HDR video, e.g., perceptual quantization (PQ) or hybrid log-gamma (HLG) encoding. In other words, the left half and right half in the BL frame can be signaled for SDR or HDR in its best intended rendering experience. Both sides can be SDR or HDR, or one side is SDR and the other is HDR (as in the example shown in FIG. 2). This signaling can be at each frame, or at a GOP or segment level where the same signaling applies to multiple frames. The signaling is used, after BL decoding, for the player to render pictures for display and also used for processing the BL frames accordingly when inter-layer prediction is supported in encoding the EL frames.

Figure 3:
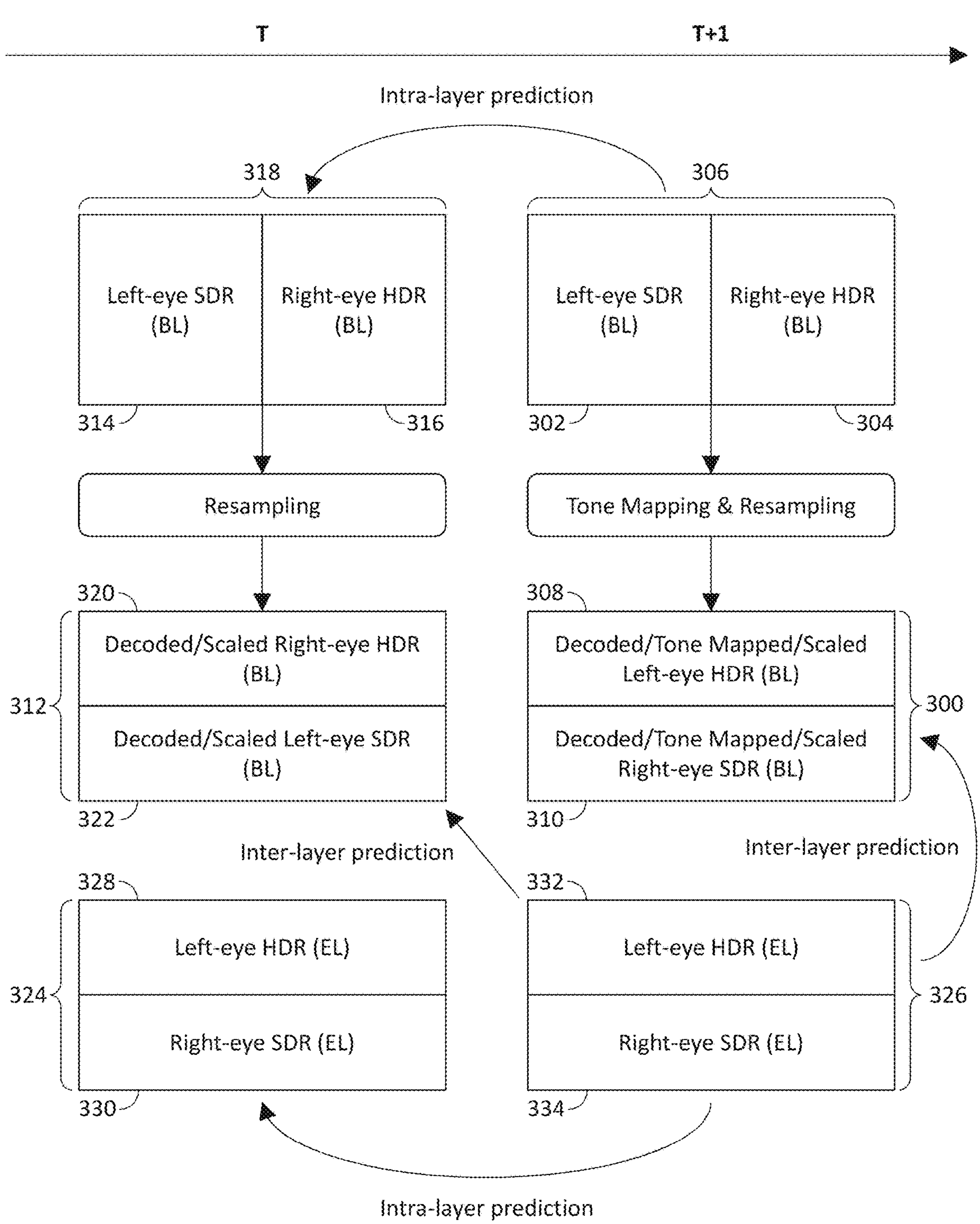
FIG. 3 shows an illustrative example of intra-layer and inter-layer prediction, in accordance with some embodiments of the disclosure.

FIG. 3 shows an illustrative example of intra-layer and inter-layer prediction, in accordance with some embodiments of the disclosure. As shown in FIG. 3, the picture structures for intra-layer prediction and inter-layer prediction in encoding EL frames allows for better compression efficiency. In other words, each EL frame will have multiple reference frames to minimize the residue after prediction and compensation. In the example of FIG. 3, the reference frame, or its corresponding halves, will be resampled or scaled for prediction, similar to the reference picture resampling (RPR) in Versatile Video Coding (also known as H.266 or MPEG-I Part 3, defined in ISO/IEC 23090-3).

In addition, the processing of reference frames from the BL can include tone mapping and/or inverse tone mapping. For the simplicity of illustration in FIG. 3, only tone mapping is shown. In the example of FIG. 3, reference frame 300 is composed of resampled and tone mapped/inverse tone mapped versions of left-eye SDR frame 302 and right-eye HDR frame 304 from decoded BL frame 306 at time T+1. Left-eye SDR frame 302 is resampled from a horizontally scaled frame to a vertically scaled frame, and is processed using inverse tone mapping to generate HDR content. This reprocessed version of left-eye frame 302 is then placed in the top half 308 of reference frame 300. The bottom half 310 of reference frame 300 results from tone mapping right-eye HDR frame 304 and resampling it to create a vertically scaled frame. Reference frame 312 is composed of resampled versions of left-eye SDR frame 314 and right-eye HDR frame 316 from decoded BL frame 318 at time T. Unlike reference frame 300, the top half 320 of reference frame 312 includes the vertically scaled version of the right-eye HDR frame while the bottom half 322 includes the vertically scaled version of the left-eye SDR frame. Accordingly, reference frames 308 and 320 both have HDR content on the top and SDR content on the bottom, corresponding to the packing choice of EL frames 324 and 326. In other words, EL frame 324 includes left-eye HDR content in its top half 328 and right-eye SDR content in its bottom half 330 and EL frame 326 includes left-eye HDR content in its top half 332 and right-eye SDR content in its bottom half 334.

The advantage of using such reference frames at T and T+1 is multifold. At T+1, the top half of EL 326 and the top half of reference BL 300 are both from the same perspective, i.e., the left-eye perspective. Therefore, there is no parallax for which to compensate in the prediction. Meanwhile, the top half 320 of reference BL 312 at T is from unmapped HDR, which is useful in predicting the HDR in the top half of EL at T+1. These top halves 320 and 332 are from different eyes, which assumes some degree of parallax for objects depicted in each frame. However, frames at T and T+1 will also include motion. If there is no significant motion, no additional processing will be required for the reference frame 308 at T+1. If the difference owing to motion is less significant than the difference due to parallax, the priority can be changed so that the same processing at T+1 can be applied to T so that the reference frame 312 matches the structure of the EL frames.

The above choices in packing the reference frames after BL decoding are illustrative, but not limiting. Other combinations are allowed in constructing the reference frames 300, 312 after decoding BL frames 306, 318, including the parities in SDR vs. HDR, left-eye vs. right-eye, top vs. bottom, left vs. right, etc. The flexibility will be given to the encoder in its optimization and then signal the combinations for the decoder to properly construct the reference frames.

Other processing such as bit-shift may be required in generating the appropriate reference frames for inter-layer prediction. This occurs if the BL is encoded in an 8-bit encoding scheme while the EL encoding supports and leverages 10-bit encoding.

Figure 4:
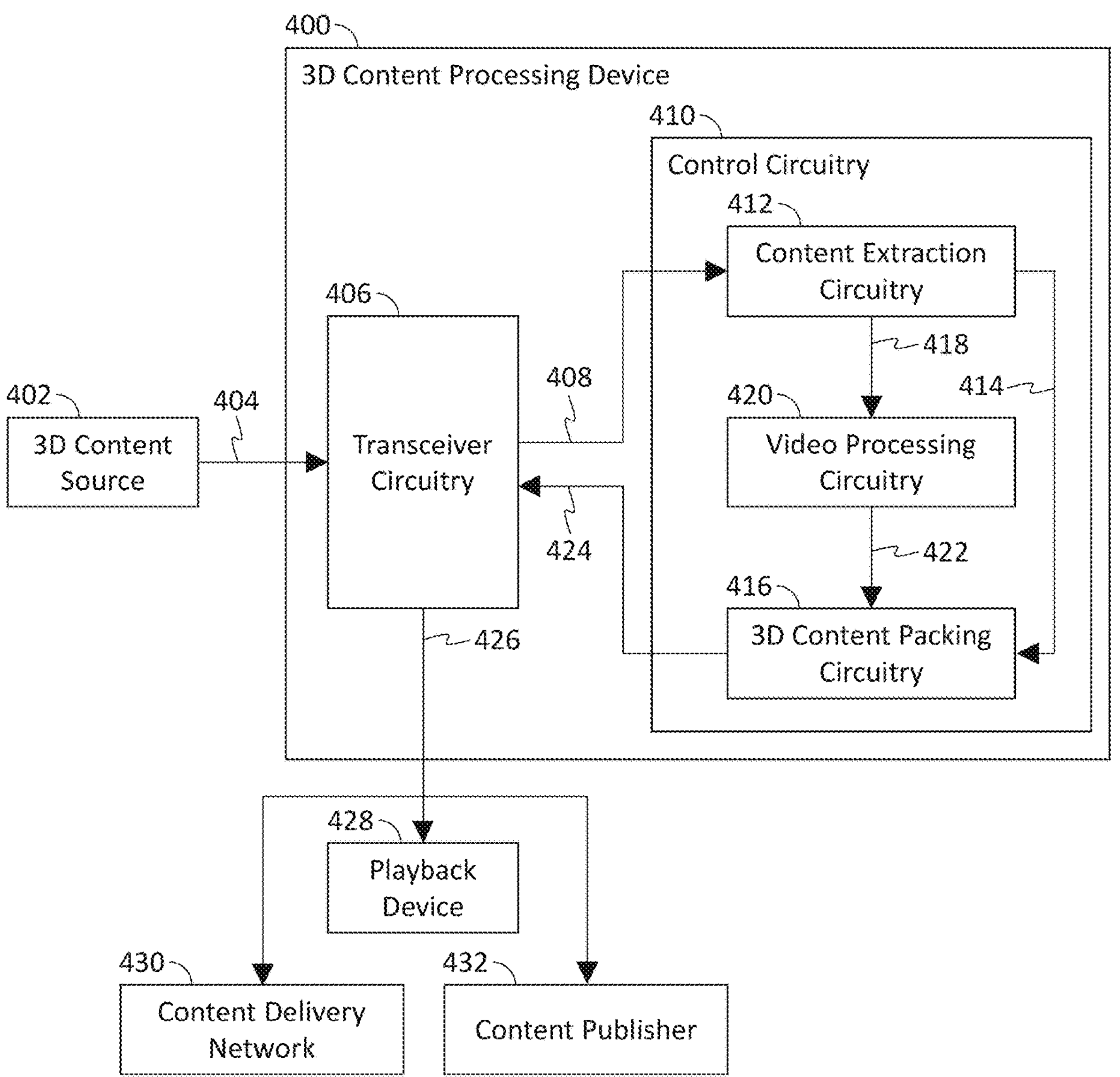
FIG. 4 is a block diagram showing components and dataflow therebetween of a system for packing 3D HDR content for delivery compatible with multiple output formats, in accordance with some embodiments of the disclosure.

FIG. 4 is a block diagram showing components and dataflow therebetween of a system for packing 3D HDR content for delivery compatible with multiple output formats, in accordance with some embodiments of the disclosure. 3D content processing device 400 retrieves 3D content. For example, 3D content processing device 400 may request a 3D content stream or 3D content file from 3D content source 402. In some embodiments, 3D content source 402 may be a local storage device. For example, 3D content source 402 may be any suitable electronic storage device such as random-access memory, read-only memory, hard drives, optical drives, solid state devices, quantum storage devices, or any other suitable fixed or removeable storage devices, and/or any combination of the same. In other embodiments, 3D content source 402 may be a remote storage device or remote server. 3D content source 402 transmits 404 3D content to 3D content processing device 400. In the case of a local storage device, the transmission 404 of content may be over a data bus or other physical connection. In cases where 3D content source 402 is a remote storage device or remote server, transmission 404 of content may be over a network connection, such as a local area network (LAN), wireless LAW, the Internet, or any other suitable communication network path. The 3D content is received by 3D content processing device 400 using transceiver circuitry 406. Transceiver circuitry 406 may comprise a data bus connection or physical data connection port (e.g., USB). Transceiver circuitry 406 may also comprise a network connection over which data can be transmitted to and received from remote devices, such as an Ethernet connection, Wi-Fi connection, mobile broadband interface, or connection employing any other suitable network protocol. Transceiver circuitry 406 in turn transmits 408 the received 3D content to control circuitry 410, wherein it is processed using content extraction circuitry 412.

Control circuitry 410 may be based on any suitable processing circuitry and comprises control circuitry and memory circuitry, which may be disposed on a single integrated circuit or may be discrete components. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor).

Content extraction circuitry 412 processes the 3D content to extract video corresponding to different perspectives. Content extraction circuitry 412 may extract a left-eye perspective version of the content and a right-eye perspective version of the content. Any audio content included in the 3D content received from 3D content source 402 may be separately extracted and transmitted 414 to 3D content packing circuitry for 416. The extracted left-eye perspective version and right-eye perspective version of the content are transmitted 418 to video processing circuitry 420.

Video processing circuitry 420 processes each perspective version of the content separately. Video processing circuitry 420 first filters and scales the left-eye perspective version of the content in the horizontal direction to create a half-resolution version of the left eye perspective of the content that is half as wide as the original 3D content. Assuming the original 3D content received from 3D content source 402 is HDR content, video processing circuitry 420 performs tone mapping on the horizontally-scaled version of the left-eye perspective of the content to generate an SDR version of the horizontally-scaled content. Video processing circuitry 420 also filters and scales the left-eye perspective version of the content in the vertical direction to create a half-resolution version of the left eye perspective of the content that is half as high as the original 3D content.

Video processing circuitry 420 then filters and scales the right-eye perspective version of the content in the horizontal direction to create a half-resolution version of the left eye perspective of the content that is half as wide as the original 3D content. Video processing circuitry 420 also filters and scales the right-eye perspective version of the content in the vertical direction to create a half-resolution version of the left eye perspective of the content that is half as high as the original 3D content. Again assuming the original 3D content received from 3D content source 402 is HDR content, video processing circuitry 420 performs tone mapping on the vertically-scaled version of the right-eye perspective of the content to generate an SDR version of the vertically-scaled content.

Video processing circuitry 420 transmits 422 to processed content to 3D content packing circuitry 416. 3D content packing circuitry 416 packs the SDR version of the horizontally-scaled left-eye perspective of the content and the HDR version of the horizontally-scaled right-eye perspective of the content in the BL of a content delivery format. 3D content packing circuitry 416 packs the HDR version of the vertically scaled left-eye perspective of the content and the SDR version of the vertically-scaled right-eye perspective of the content in the EL of the content delivery format. Audio data may also be added to a separate elementary stream or other bitstream within the delivery format. 3D content packing circuitry 416 then transmits 424 the packed 3D content to transceiver circuitry 406, which in turn transmits 426 the packed 3D content to a playback device 428. Alternatively or additionally, the packed 3D content may be transmitted to a content delivery network 430 or a content publisher 432 for distribution to other playback devices or for storage.

The 3D content received from 3D content source 402 may also be SDR content. In such cases, video processing circuitry 420 may perform inverse tone mapping on a left-eye perspective version of the content scaled in one direction (e.g., horizontally) and a right-eye perspective version of the content scaled in another direction (e.g., vertically). As above, this results in both SDR and HDR half-resolution versions of both eye perspectives of the content. Packing of the content by 3D content packing circuitry 416 may process similarly to above, placing a SDR version of one eye perspective with a HDR version of the other eye perspective in the BL, and vice versa in the EL.

A version of video processing circuitry 420 may be implemented in playback device 428. Playback device 428 may support processing of HDR content and not support processing of the EL of the content delivery format. Playback device may employ video processing circuitry to perform inverse tone mapping on the SDR content contained in the BL to generate corresponding HDR content. Playback device 428 thus has HDR versions of both eye perspectives and is therefore able to output 3D HDR content. Likewise, if playback device 428 does not support processing of SDR content, video processing circuitry may be employed by playback device 428 to perform tone mapping on the HDR content contained in the BL to obtain corresponding SDR content. Playback device 428 may then output 3D SDR content. Similar processing may be performed in cases where the playback device supports processing of the EL of the content delivery format but does not support processing of HDR content.

Figure 5:
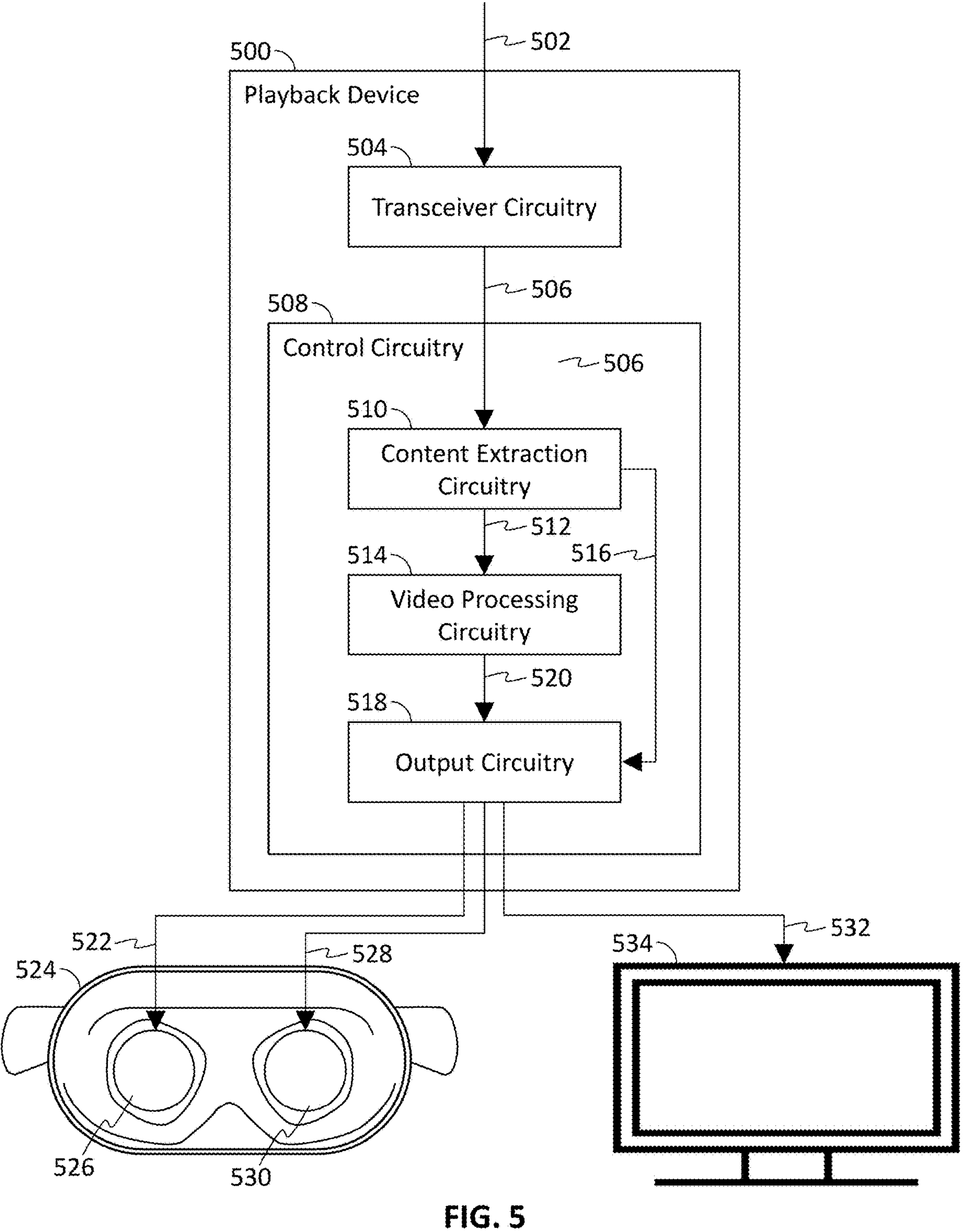
FIG. 5 is a block diagram showing components and dataflow therebetween of a playback device for processing content packed in a delivery format in accordance with some implementations of the disclosure.

FIG. 5 is a block diagram showing components and dataflow therebetween of a playback device for processing content packed in a delivery format in accordance with some implementations of the disclosure. Playback device 500 receives 502 a content stream comprising 3D content packed in a delivery format as described above. The 3D content is received using transceiver circuitry 504. Transceiver circuitry 504 may comprise a network connection over which data can be transmitted to and received from remote devices, such as an Ethernet connection, Wi-Fi connection, mobile broadband interface, or connection employing any other suitable network protocol. Transceiver circuitry 504 in turn transmits 506 the content stream to control circuitry 508, where it is processed using content extraction circuitry 510.

Control circuitry 508 may be based on any suitable processing circuitry and comprises control circuitry and memory circuitry, which may be disposed on a single integrated circuit or may be discrete components. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor).

Content extraction circuitry 510 may extract media data from the content steam. Depending on the configuration of content extraction circuitry 510 and/or the capabilities of playback device 500, the content extracted from the content stream may vary. If playback device 500 is capable of processing HDR content, HDR content may be extracted from the content stream. If playback device 500 is not capable of processing HDR content, then SDR content may be extract from the content stream. Similarly, if playback device 500 is capable of processing the EL of the delivery format, then content from both the BL and EL may be extracted from the content stream. If playback device 500 is not capable of processing the EL, then content may only be extracted from the BL. Additionally, playback device 500 may not be configured to output 3D content. In such a case, content corresponding to only one eye perspective may be extracted from the BL and, if possible, the EL.

The extracted 2D or 3D content extracted from the content stream is transmitted 512 to video processing circuitry 514. Audio data may be extracted separately from the content stream and transmitted 516 to output circuitry 518. Video processing circuitry 514 may perform upscaling, tone mapping and/or inverse tone mapping as discussed above to generate full-resolution content for output. The processed video content, whether in 2D or 3D, is transmitted 520 to output circuitry 518. Output circuitry 518 then transmits the content to be output. In the case of 3D content, output circuitry 518 transmits 522 left-eye perspective content to 3D display 524 to be displayed on left-eye display element 526. Output circuitry 518 transmits 528 right-eye perspective content to 3D display 524 to be displayed on right-eye display element 530. In the case of 2D content, output circuitry 518 transmits 532 the 2D content to 2D display device 534.

Figure 6:
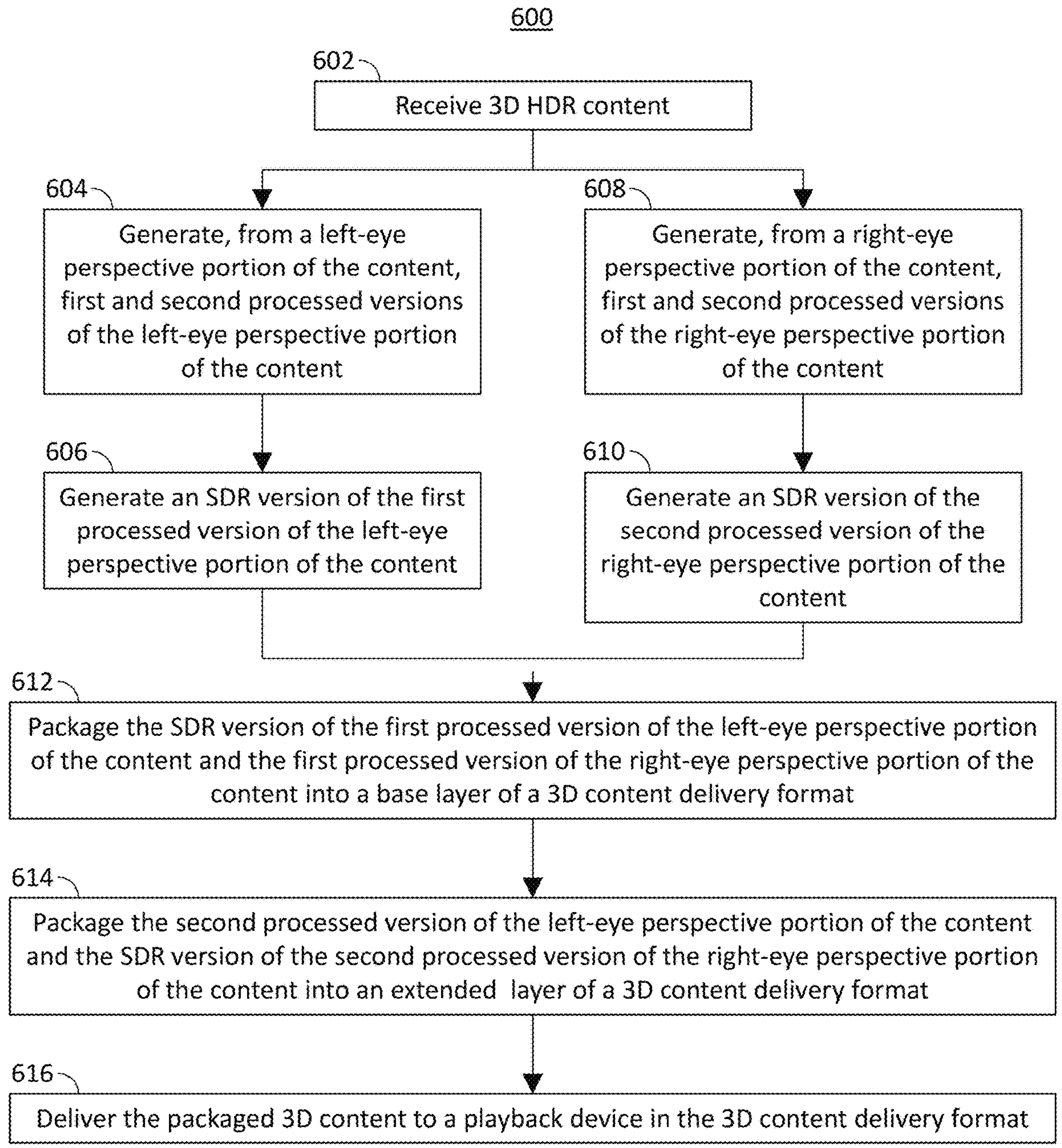
FIG. 6 is a flowchart representing an illustrative process for packing 3D HDR content for delivery compatible with multiple output formats, in accordance with some embodiments of the disclosure.

FIG. 6 is a flowchart representing an illustrative process 600 for packing 3D HDR content for delivery compatible with multiple output formats, in accordance with some embodiments of the disclosure. Process 600 may be implemented on control circuitry 410. In addition, one or more actions of process 600 may be incorporated into or combined with one or more actions of any other process or embodiment described herein.

At 602, control circuitry 410 receives 3D HDR content. The 3D HDR content may be received from a local memory or a remote storage system or remote server. At 604, control circuitry 410 generates, from a left-eye perspective portion of the content, first and second processed versions of the left-eye perspective portion of the content. For example, the first processed version may be generated by filtering and scaling the left-eye perspective portion of the content in the horizontal direction, resulting in a version that is half of the original horizontal resolution of the 3D HDR content. The second processed version may be generated by filtering and scaling the left-eye perspective portion of the content in the vertical direction, resulting in a version that is half of the original vertical resolution of the 3D HDR content.

At 606, control circuitry 410 generates an SDR version of the first processed version of the left-eye perspective portion of the content. For example, control circuitry 410 may perform tone mapping on the first processed version of the content. This reduces the number of colors present in the content while maintaining overall picture quality.

At 608, control circuitry 410 generates, from a right-eye perspective portion of the content, first and second processed version of the right-eye perspective portion of the content. As with the left-eye perspective portion, this may be accomplished by filtering and scaling the right-eye perspective portion of the content in different directions. For example, the first processed version of the right-eye perspective portion of the content may be generated by filtering and scaling the right-eye perspective portion of the content in the horizontal direction and the second processed version may be generated by filtering and scaling the right-eye perspective portion of the content in the vertical direction.

At 610, control circuitry 410 generates an SDR version of the second processed version of the right-eye perspective portion of the content. For example, control circuitry 410 may perform tone mapping on the second processed version of the right-eye perspective portion of the content.

At 612, control circuitry 410 packs the SDR version of the first processed version of the left-eye perspective portion of the content and the first processed version of the right-eye perspective portion of the content into a BL of a 3D content delivery format. At 614, control circuitry 410 packs the second version of the left-eye perspective portion of the content and the SDR version of the second processed version of the right-eye perspective portion of the content into a EL of the 3D content delivery format. As shown in the example embodiment of FIG. 1, this results in a BL containing a SDR version of the left-eye perspective and a HDR version of the right-eye perspective, both horizontally scaled to as to each occupy half of the horizontal resolution of the BL, and an EL containing a HDR version of the left-eye perspective and a SDR version of the right-eye perspective, both vertically scaled so as to each occupy half of the vertical resolution of the EL. At 616, control circuitry 410 delivers the packed 3D content to a playback device in the 3D content delivery format.

The actions and descriptions of FIG. 6 may be used in any other embodiment of this disclosure. In addition, the actions and descriptions described in relation to FIG. 5 may be done in suitable alternative orders or in parallel to further the purposes of this disclosure.

Figure 7:
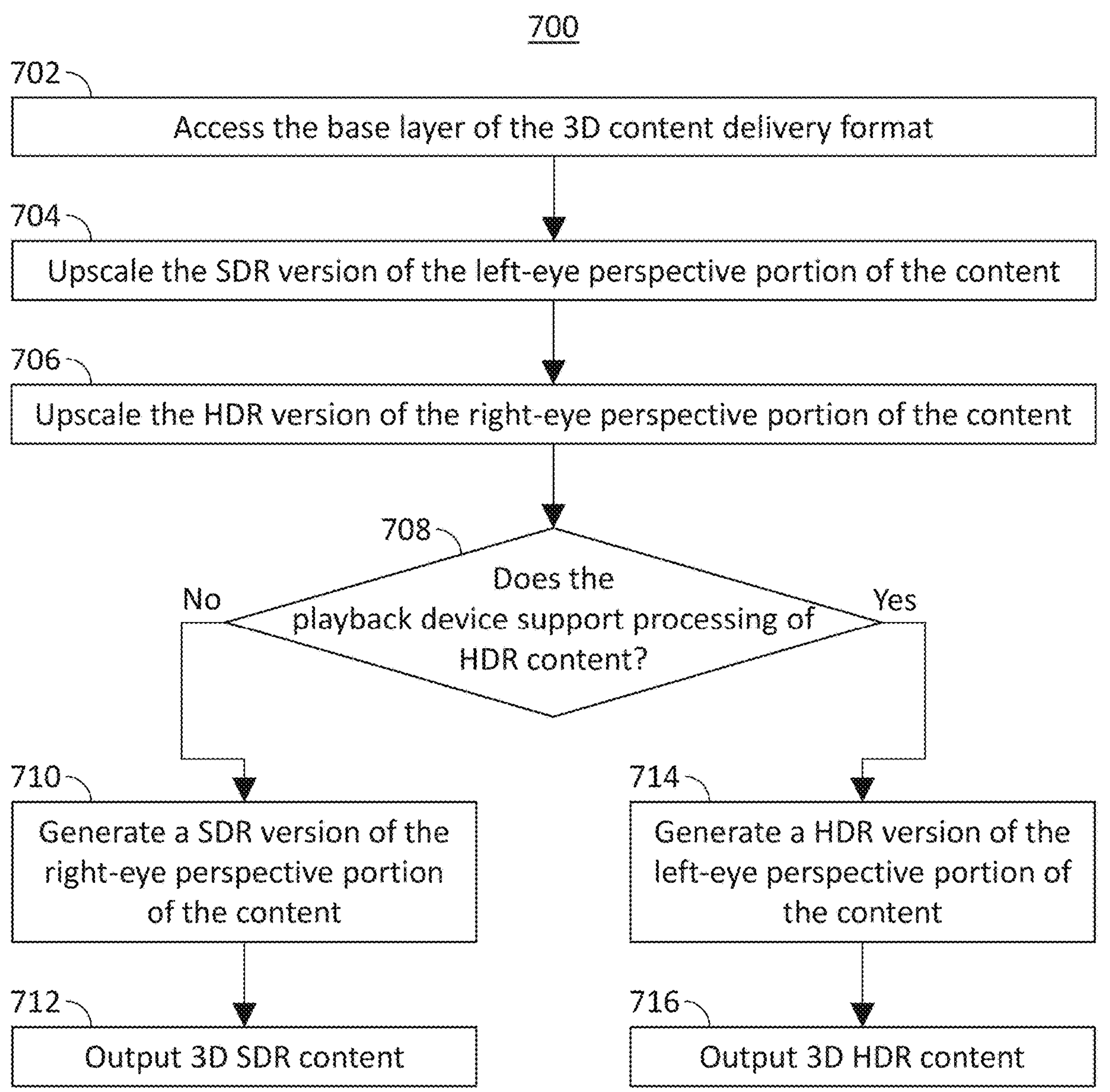
FIG. 7 is a flowchart representing an illustrative process for unpacking and reconstituting 3D content from data packed in the base layer of a delivery format, in accordance with some embodiments of the disclosure.

FIG. 7 is a flowchart representing an illustrative process for unpacking and reconstituting 3D content from data packed in the BL of a delivery format, in accordance with some embodiments of the disclosure. Process 700 may be implemented on control circuitry 508. In addition, one or more actions of process 700 may be incorporated into or combined with one or more actions of any other process or embodiment described herein.

At 702, control circuitry 508 accesses the BL of the 3D content delivery format. Control circuitry 508 may retrieve or extract, from the BL, the two versions of the content included therein, as described above in connection with FIGS. 1 and 4. In the example of FIG. 1, the BL contains a horizontally scaled SDR version of the left-eye perspective portion of the content and a horizontally scaled HDR version of the right-eye perspective portion of the content.

At 704, control circuitry 508 upscales the SDR version of the left-eye perspective portion of the content. For example, control circuitry 508 may process the horizontally scaled content to restore it to the full original horizontal resolution. At 706, control circuitry 508 similarly upscales the HDR version of the right-eye perspective portion of the content.

At 708, control circuitry 508 determines whether the playback device supports processing of HDR content. For example, control circuitry 508 may request, from a content processing component, module, or circuitry, information on the content processing capabilities and/or configuration of the playback device.

If control circuitry 508 determines that the playback device does not support processing of HDR content ("No") at 708), then, at 710, control circuitry 508 generates a SDR version of the right-eye perspective portion of the content. This may be achieved using tone mapping, as described above in connection with FIGS. 1 and 4. After generating the SDR version of the right-eye perspective portion of the content, control circuitry 508 has access to SDR versions of both eye perspectives and, at 712, outputs 3D SDR content.

If control circuitry 508 determines that the playback device does support processing of HDR content ("Yes" at 708), then, at 714, control circuitry 508 generates a HDR version of the left-eye perspective portion of the content. This may be achieved using inverse tone mapping, as described above in connection with FIGS. 1 and 4. After generating the HDR version of the left-eye perspective portion of the content, control circuitry 508 gas access to HDR versions of both eye perspectives and, at 716, outputs 3D HDR content.

The actions and descriptions of FIG. 7 may be used in any other embodiment of this disclosure. In addition, the actions and descriptions described in relation to FIG. 7 may be done in suitable alternative orders or in parallel to further the purposes of this disclosure.

Figure 8:
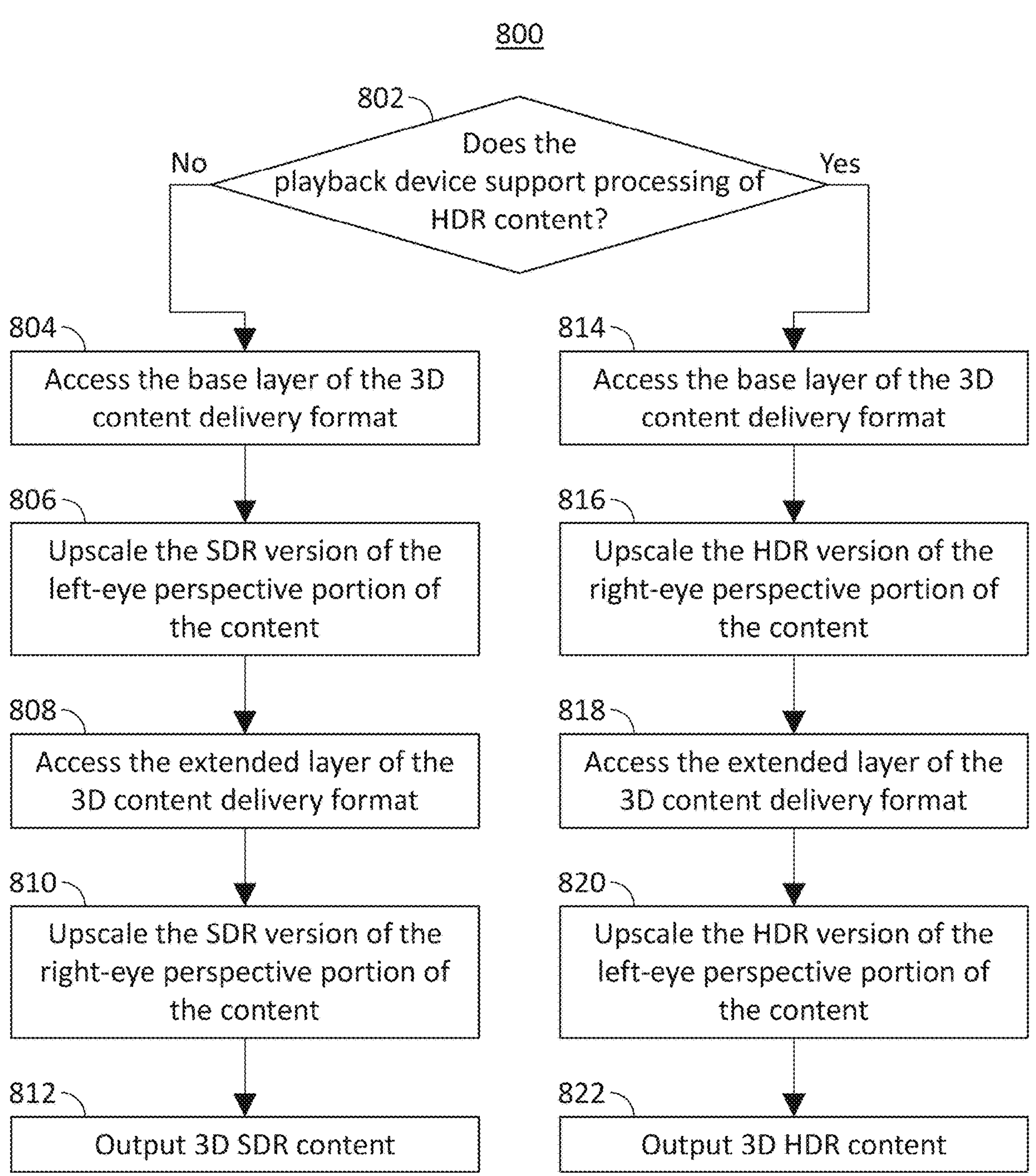
FIG. 8 is a flowchart representing an illustrative process for unpacking and reconstituting 3D content from data packed in the base layer and enhancement layer of a delivery format, in accordance with some embodiments of the disclosure.

FIG. 8 is a flowchart representing an illustrative process for unpacking and reconstituting 3D content from data packed in the BL and EL of a delivery format, in accordance with some embodiments of the disclosure. Process 800 may be implemented on control circuitry 508. In addition, one or more actions of process 800 may be incorporated into or combined with one or more actions of any other process or embodiment described herein.

At 802, control circuitry 508 determines whether the playback device supports processing of HDR content. This may be achieved using methods described above in connection with FIG. 7.

If control circuitry 508 determines that the playback device does not support processing of HDR content ("No" at 802), then, at 804, control circuitry 508 accesses the BL of the 3D content delivery format. In the example of FIG. 1, the BL contains a horizontally scaled SDR version of the left-eye perspective portion of the content and a horizontally scaled HDR version of the right-eye perspective portion of the content. Control circuitry 508 may retrieve or extract, from the BL, the SDR version of the left-eye perspective portion of the content. At 806, control circuitry 508 upscales the SDR version of the left-eye perspective portion of the content. For example, control circuitry 508 may process the horizontally scaled left-eye perspective portion of the content to restore it to the full original horizontal resolution.

At 808, control circuitry 508 accesses the EL of the 3D content delivery format. In the example of FIG. 1, the EL contains a vertically scaled HDR version of the left-eye perspective portion of the content and a vertically scaled SDR version of the right-eye perspective portion of the content. Control circuitry 508 may retrieve or extract, from the EL, the SDR version of the right-eye perspective portion of the content. At 810, control circuitry 508 upscales the SDR version of the right-eye perspective portion of the content. For example, control circuitry 508 may process the vertically scaled right-eye perspective portion of the content to restore it to the full original vertical resolution.

After upscaling, control circuitry 508 has access to SDR versions of each eye perspective of the content. At 812, control circuitry 508 output 3D SDR content.

If control circuitry 508 determines that the playback device does support processing HDR content ("Yes" at 802), then, at 814, control circuitry 508 accesses the BL of the 3D content delivery format. Control circuitry 508 may retrieve or extract, from the BL, the HDR version of the right-eye perspective portion of the content. At 816, control circuitry 508 upscales the HDR version of the right-eye perspective portion of the content. For example, control circuitry 508 may process the horizontally scaled right-eye perspective portion of the content to restore it to the full original horizontal resolution.

At 818, control circuitry 508 accesses the EL of the 3D content delivery format. Control circuitry 508 may retrieve or extract, from the EL, the HDR version of the left-eye perspective portion of the content. At 820, control circuitry 508 upscales the HDR version of the left-eye perspective portion of the content. For example, control circuitry 508 may process the vertically scaled left-eye perspective portion of the content to restore it to the full original vertical resolution.

After upscaling, control circuitry 508 has access to HDR versions of each eye perspective of the content. At 822, control circuitry 508 output 3D HDR content.

The actions and descriptions of FIG. 8 may be used in any other embodiment of this disclosure. In addition, the actions and descriptions described in relation to FIG. 8 may be done in suitable alternative orders or in parallel to further the purposes of this disclosure.

Figure 9:
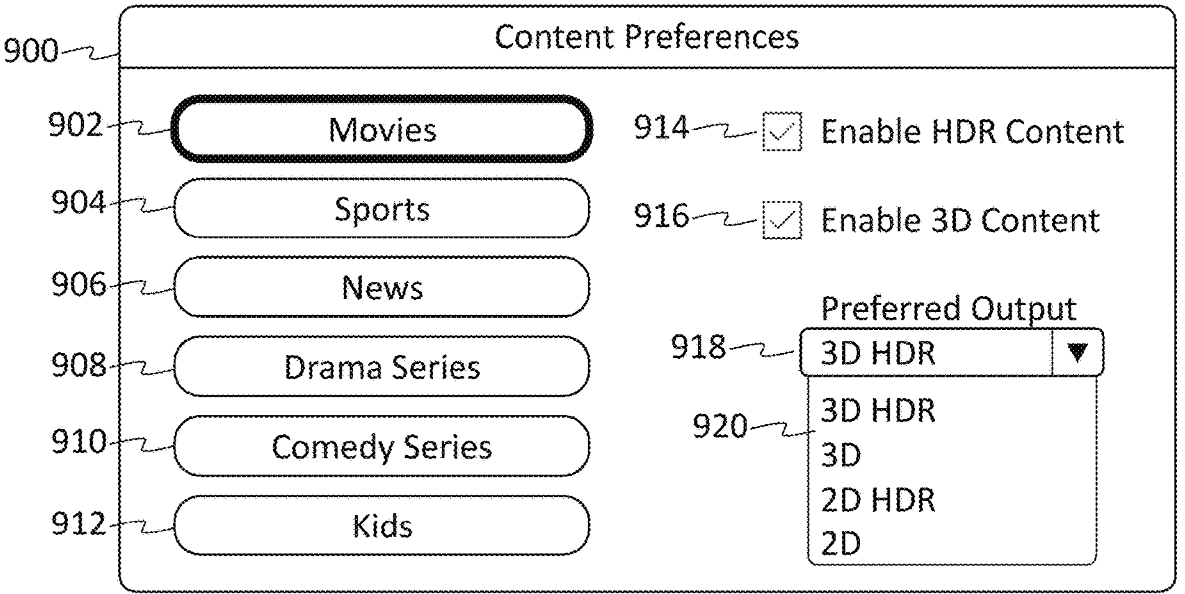
FIG. 9 is an illustrative example of a user interface allowing a user to set output preferences for different types of content, in accordance with some embodiments of the disclosure.

FIG. 9 is an illustrative example of a user interface 900 allowing a user to set output preferences for different types of content, in accordance with some embodiments of the disclosure. User interface 900 provides the user with content preference options for different content types. User interface elements 902, 904, 906, 908, 910, and 912 correspond to different content types or genres. In some embodiments, one or more user interface elements may be displayed corresponding to specific content items or specific content series. Upon receiving an input associated with, for example, user interface element 902, user interface elements 914, 916, and 918 may be displayed. By interacting with user interface elements 914, 916, and 918, a user may control the content output behavior of the playback device for the selected type of content. In the example of FIG. 9, user interface element 902 corresponds to "movies." The user may select to enable, or deselect to disable, HDR content output by toggling user interface element 914. The user may also select to enable, or deselect to disable, 3D content output by toggling user interface element 916. The user may further indicate a preferred content output using user interface element 918. User interface element 918 may be a dropdown box. An input associated with user interface element 918 may cause display of dropdown selection 920 through which the user may choose a preferred content output.

In some embodiments, the content output types listed in dropdown selection 920 may change based on the settings of user interface elements 914 and 916. Alternatively or additionally, the output content types listed in dropdown selection 920 may reflect the capabilities of the playback device. If the playback device is not a 3D display, 3D output may not be displayed as an option. Similarly, if the playback device is not a 3D display, user interface element 916 may not be displayed, or may be disabled (e.g., greyed out) such that the user cannot select to enabled 3D content output. User preferences may be device specific or may be propagated to all devices associated with the user.

Figure 10:
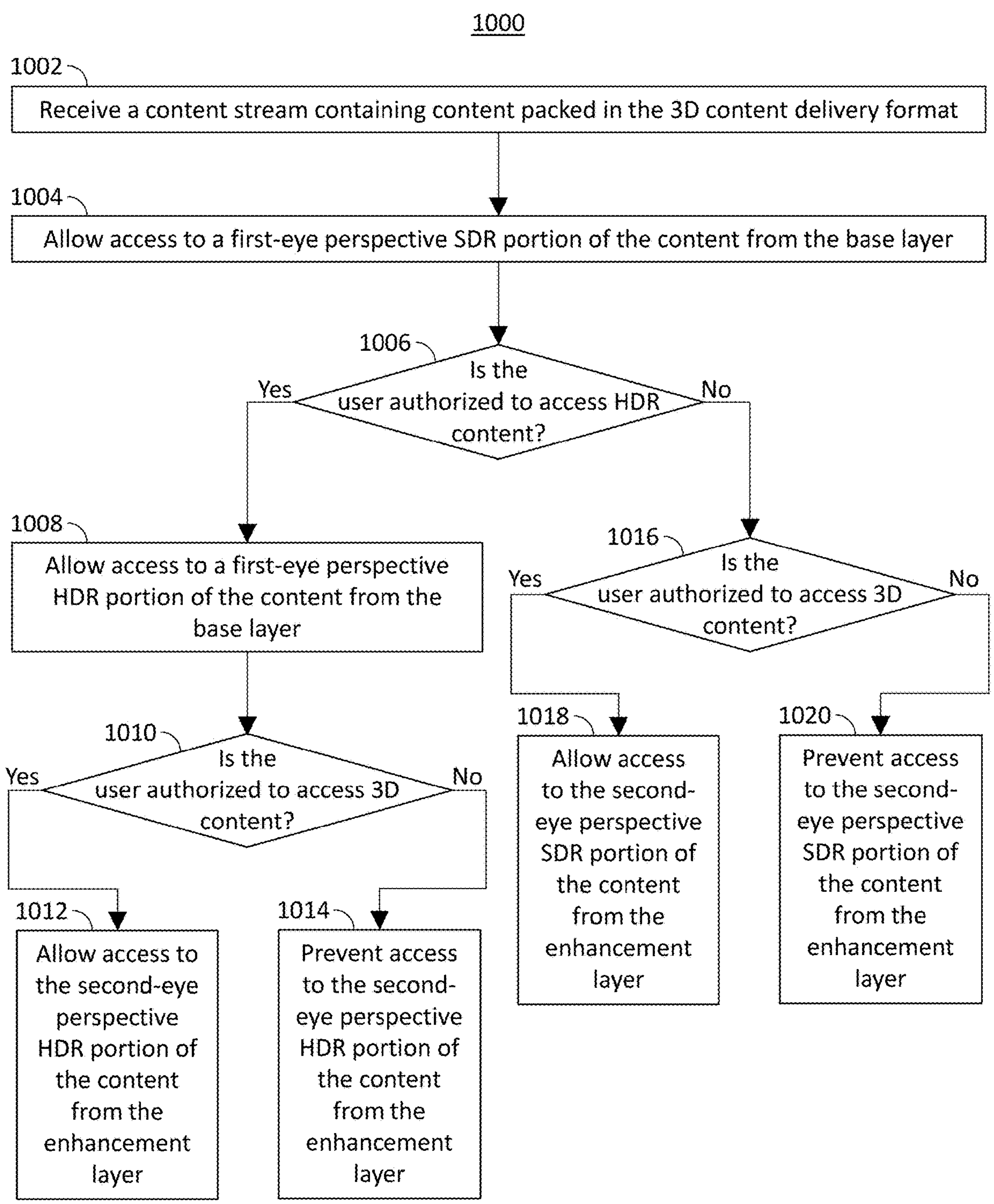
FIG. 10 is a flowchart representing an illustrative process for allowing access to different versions of the content based on a user subscription level, in accordance with some embodiments of the disclosure.

FIG. 10 is a flowchart representing an illustrative process 1000 for allowing access to different versions of the content based on a user subscription level, in accordance with some embodiments of the disclosure. Process 1000 may be implemented on control circuitry 508. In addition, one or more actions of process 1000 may be incorporated into or combined with one or more actions of any other process or embodiment described herein.

At 1002, control circuitry 508 receives a content stream containing content packed in the 3D content delivery format. Since the 3D content delivery format is designed to support different content output variations, content may always be delivered in the 3D content delivery format as described above, regardless of the capabilities of the playback device or the subscription level of the user. This is in contrast to current systems in which a manifest file associated with the content stream only includes references for the types of content supported by, or authorized for access at, the playback device.

At 1004, control circuitry 508 allows access to a first-eye perspective SDR portion of the content from the BL of the content delivery format. For example, an SDR version of the left-eye perspective portion of the content may be packed in the BL. If the lowest possible subscription level authorizes access to 2D SDR content, control circuitry 508 may safely allow access to an SDR version of one perspective, which can be output as 2D SDR content.

At 1006, control circuitry 508 determines whether the user is authorized to access HDR content. For example, control circuitry 508 may access, request, or retrieve subscription information for the user currently associated with the playback device. The subscription information may be stored locally in memory of the playback device, or on a remote server.

If the user is authorized to access HDR content ("Yes" at 1006), then, at 1008, control circuitry 508 allows access to a first-eye perspective HDR portion of the content from the BL of the content delivery format. For example, an HDR version of the right-eye perspective portion of the content may be packed in the BL and can be used to output 2D HDR content.

At 1010, control circuitry 508 determines whether the user is authorized to access 3D content. As above, control circuitry 508 may use subscription information to make this determination. If the user is authorized to access 3D content ("Yes" at 1010), then, at 1012, control circuitry 508 allows access to the second-eye perspective HDR portion of the content from the EL of the content delivery format. For example, while the HDR version of the right-eye perspective of the content is packed in the BL, the HDR version of the left-eye perspective portion of the content may be packed in the EL. Using HDR versions of both eye perspectives, control circuitry 508 may output 3D HDR content. If the user is not authorized to access 3D content ("No" at 1010), then, at 1014, control circuitry 508 may prevent access to the second-eye perspective HDR portion of the content from the EL, thereby only allowing output of 2D HDR content.

If the user is not authorized to access HDR content ("No" at 1006), then, at 1016, control circuitry 508 may at that point determine whether the user is authorized to access 3D content. If the user is authorized to access 3D content ("Yes" at 1016), then, at 1018, control circuitry 508 allows access to the second-eye perspective SDR portion of the content from the EL. For example, while the SDR version of the left-eye perspective of the content is packed in the BL, the SDR version of the right-eye perspective portion of the content may be packed in the EL. Using SDR versions of both eye perspectives, control circuitry 508 may output 3D SDR content. If the user is not authorized to access 3D content ("No" at 1016), then, at 1020, control circuitry 508 may prevent access to the second-eye perspective SDR portion of the content from the EL, thereby only allowing output of 2D SDR content.

The actions and descriptions of FIG. 10 may be used in any other embodiment of this disclosure. In addition, the actions and descriptions described in relation to FIG. 10 may be done in suitable alternative orders or in parallel to further the purposes of this disclosure.

In some embodiments, a manifest file associated with the content may be customized for each user requesting the content. In response to the content request, a server (e.g., an edge server in a content delivery network) may identify the requesting user and determine the requesting user's subscription level. Alternatively or additionally, the request may identify the capabilities of the playback device. The manifest file may then be generated for the requesting user including an attribute defining the allowed viewing modes. The playback device may then be restricted to only those modes defined by this attribute.

Figure 11:
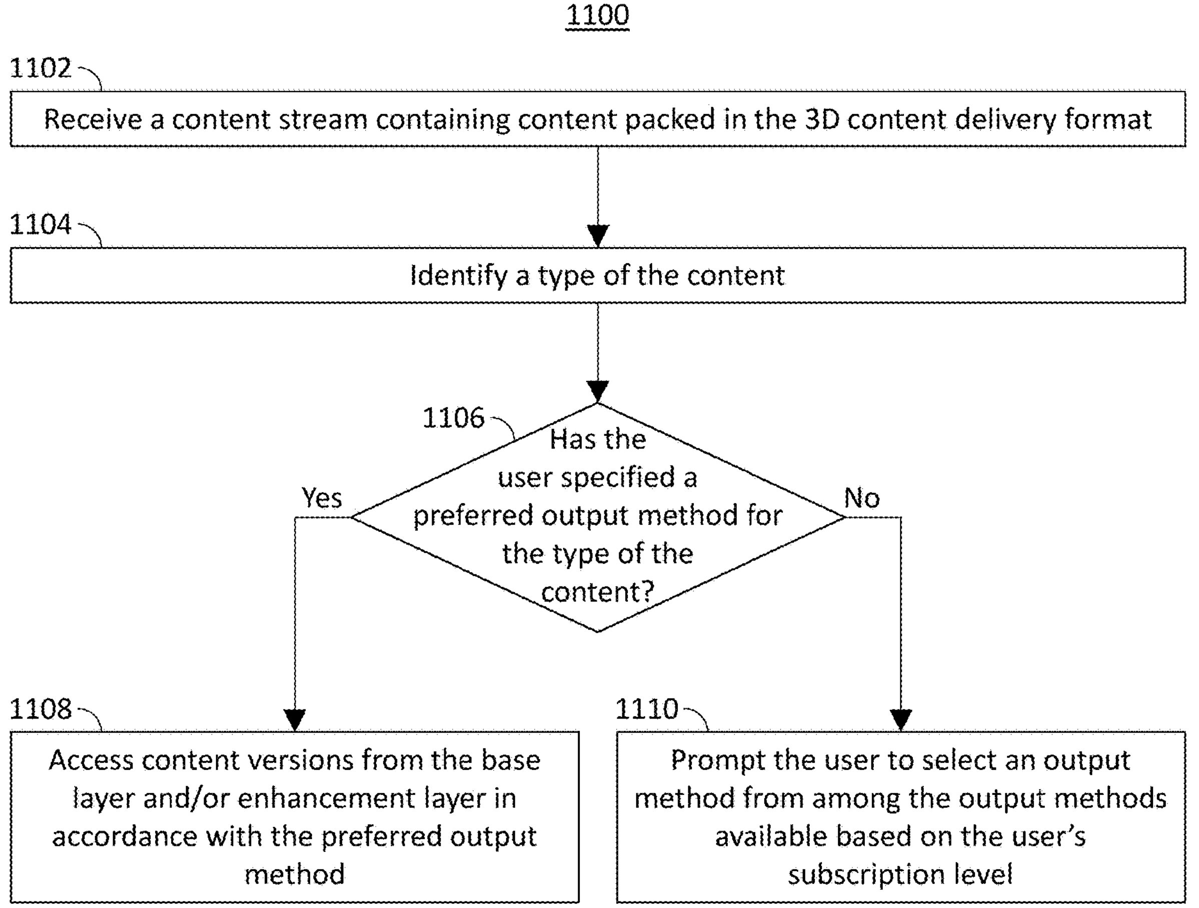
FIG. 11 is a flowchart representing an illustrative process for accessing different versions of the content based on user preferences, in accordance with some embodiments of the disclosure.

FIG. 11 is a flowchart representing an illustrative process 1100 for accessing different versions of the content based on user preferences, in accordance with some embodiments of the disclosure. Process 1100 may be implemented on control circuitry 508. In addition, one or more actions of process 1100 may be incorporated into or combined with one or more actions of any other process or embodiment described herein.

At 1102, control circuitry 508 may receive a content stream containing content packed in the 3D content delivery format. At 1104, control circuitry 508 may identify a type of the content. The type may indicate whether the content is series or a movie and/or may indicate a genre of the content. For example, control circuitry 508 may access, request, or retrieve metadata associated with the content. Based on the metadata, control circuitry 508 may determine the type of the content.

At 1106, control circuitry 508 determines whether the user has specified a preferred output method for the type of content. For example, the user may prefer to watch movies in 3D HDR, to watch sports programs in 2D HDR, and to watch news programs in 2D SDR. User preferences may be stored locally or retrieved from a remote server.

If the user has specified a preferred output method of the type of content ("Yes" at 1106), then, at 1108, control circuitry 508 access content versions from the BL and/or EL in accordance with the preferred output method. For example, if the preferred output method is 3D HDR, control circuitry 508 may access a HDR version of a first-eye perspective portion of the content from the BL and an HDR version of a second-eye perspective portion of the content from the EL. If the user has not specified a preferred output method ("No" at 1106), then, at 1110, control circuitry 508 prompts the user to select an output method from among the output methods available based on the user's subscription level.

The actions and descriptions of FIG. 11 may be used in any other embodiment of this disclosure. In addition, the actions and descriptions described in relation to FIG. 11 may be done in suitable alternative orders or in parallel to further the purposes of this disclosure.

The processes described above are intended to be illustrative and not limiting. One skilled in the art would appreciate that the steps of the processes described herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should be noted that the systems and/or methods described above may be applied to, or used in accordance with, other systems and/or methods.

What is claimed is:

1. A method for packing 3D high dynamic range (HDR) content for delivery compatible with multiple output formats, the method comprising:

generating, from a first eye perspective portion of the content, a first processed version of the content and a second processed version of the content;

generating, from a second eye perspective portion of the content, a third processed version of the content and a fourth processed version of the content;

generating, from the first processed version of the content, a fifth processed version of the content comprising a standard dynamic range (SDR) version of the first processed version of the content;

generating, from the fourth processed version of the content, a sixth processed version of the content comprising a SDR version of the fourth processed version of the content;

packing the second processed version of the content, the third processed version of the content, the fifth processed version of the content, and the sixth processed version of the content into a delivery format, wherein the fifth processed version of the content and the third processed version of the content are placed in a base layer of the delivery format and the second processed version of the content and the sixth processed version of the content are placed into an enhancement layer of the delivery format; and in response to determining that a playback device does not support processing the enhancement layer of the delivery format:

accessing the base layer of the delivery format;

upscaling the fifth processed version of the content; and upscaling the third processed version of the content.

2. The method of claim 1, wherein generating, from the first eye perspective portion of the content, the first processed version of the content and the second processed version of the content comprises:

filtering and scaling the first eye perspective portion of the content in a horizontal direction; and filtering and scaling the first eye perspective portion of the content in a vertical direction.

3. The method of claim 1, wherein generating, from the first processed version of the content, the fifth processed version of the content comprises performing tone mapping on the first processed version of the content.

4. The method of claim 1, wherein generating, from the second eye perspective portion of the content, the third processed version of the content and the fourth processed version of the content comprises:

filtering and scaling the second eye perspective portion of the content in a horizontal direction; and filtering and scaling the second eye perspective portion of the content in a vertical direction.

5. The method of claim 1, wherein generating, from the fourth processed version of the content, the sixth processed version of the content comprises performing tone mapping on the fourth processed version of the content.

6. The method of claim 1, wherein the multiple output formats include any one or more of 3D HDR content, 3D SDR content, 2D HDR content, and 2D SDR content.

7. The method of claim 1, further comprising delivering the packed content to the playback device.

8. The method of claim 7, wherein the playback device supports processing the enhancement layer of the delivery format and does not support processing HDR content, the method further comprising, at the playback device:

accessing the base layer of the delivery format;

upscaling the fifth processed version of the content;

accessing the enhancement layer of the delivery format;

upscaling the sixth processed version of the content; and outputting 3D SDR content based on the upscaled fifth processed version of the content and the upscaled sixth processed version of the content.

9. The method of claim 7, wherein the playback device supports processing the enhancement layer of the delivery format and supports processing HDR content, the method further comprising, at the playback device:

accessing the base layer of the delivery format;

upscaling the third processed version of the content;

accessing the enhancement layer of the delivery format;

upscaling the second processed version of the content; and outputting 3D HDR content based on the upscaled second processed version of the content and the upscaled third processed version of the content.

10. The method of claim 1, wherein the playback device does not support processing HDR content, the method further comprising, at the playback device:

generating, from the upscaled third processed version of the content, a seventh processed version of the content comprising a SDR version of the upscaled third processed version of the content; and outputting 3D SDR content based on the upscaled fifth processed version of the content and the seventh processed version of the content.

11. The method of claim 1, wherein the playback device supports processing HDR content, the method further comprising, at the playback device:

generating, from the upscaled fifth processed version of the content, an eighth processed version of the content comprising a HDR version of the upscaled fifth processed version of the content; and outputting 3D HDR content based on the eighth processed version of the content and the upscaled third processed version of the content.

12. A system for packing 3D high dynamic range (HDR) content for delivery compatible with multiple output formats, the system comprising:

input/output circuitry configured to receive the 3D HDR content; and control circuitry configured to:

generate, from a first eye perspective portion of the content, a first processed version of the content and a second processed version of the content;

generate, from a second eye perspective portion of the content, a third processed version of the content and a fourth processed version of the content;

generate, from the first processed version of the content, a fifth processed version of the content comprising a standard dynamic range (SDR) version of the first processed version of the content;

generate, from the fourth processed version of the content, a sixth processed version of the content comprising a SDR version of the fourth processed version of the content;

pack the second processed version of the content, the third processed version of the content, the fifth processed version of the content, and the sixth processed version of the content into a delivery format, wherein the fifth processed version of the content and the third processed version of the content are placed in a base layer of the delivery format and the second processed version of the content and the sixth processed version of the content are placed into an enhancement layer of the delivery format; and in response to determining that a playback device does not support processing the enhancement layer of the delivery format:

access the base layer of the delivery format;

upscale the fifth processed version of the content; and upscale the third processed version of the content.

13. The system of claim 12, wherein the control circuitry configured to generate, from the first eye perspective portion of the content, the first processed version of the content and the second processed version of the content is further configured to:

filter and scale the first eye perspective portion of the content in a horizontal direction; and filter and scale the first eye perspective portion of the content in a vertical direction.

14. The system of claim 12, wherein the control circuitry configured to generate, from the first processed version of the content, the fifth processed version of the content is further configured to perform tone mapping on the first processed version of the content.

15. The system of claim 12, wherein the control circuitry configured to generate, from the second eye perspective portion of the content, the third processed version of the content and the fourth processed version of the content is further configured to:

filter and scale the second eye perspective portion of the content in a horizontal direction; and filter and scale the second eye perspective portion of the content in a vertical direction.

16. The system of claim 12, wherein the control circuitry configured to generate, from the fourth processed version of the content, the sixth processed version of the content is further configured to perform tone mapping on the fourth processed version of the content.

17. The system of claim 12, wherein the multiple output formats include any one or more of 3D HDR content, 3D SDR content, 2D HDR content, and 2D SDR content.

18. The system of claim 12, wherein the control circuitry is further configured to deliver, using the input/output circuitry, the packed content to the playback device.

* * * * *